United States Patent
Furtner

(10) Patent No.: US 6,778,177 B1
(45) Date of Patent: Aug. 17, 2004

(54) METHOD FOR RASTERIZING A GRAPHICS BASIC COMPONENT

(75) Inventor: Wolfgang Furtner, Fuerstenfeldbruck (DE)

(73) Assignee: SP3D Chip Design GmbH, Starnberg (DE)

( * ) Notice: Subject to any disclaimer, the term of this patent is extended or adjusted under 35 U.S.C. 154(b) by 0 days.

(21) Appl. No.: 09/958,297

(22) PCT Filed: Apr. 10, 2000

(86) PCT No.: PCT/EP00/03175
§ 371 (c)(1),
(2), (4) Date: Feb. 19, 2002

(87) PCT Pub. No.: WO00/63846
PCT Pub. Date: Oct. 26, 2000

(30) Foreign Application Priority Data

Apr. 15, 1999 (DE) .......................... 199 17 092

(51) Int. Cl.[7] .............................................. G06F 12/02
(52) U.S. Cl. ....................... 345/544; 345/443; 345/506
(58) Field of Search .............................. 345/544, 501, 345/502, 503, 505, 506, 530, 418, 440, 441, 442, 443

(56) References Cited

U.S. PATENT DOCUMENTS

| | | | |
|---|---|---|---|
| 5,367,632 A | | 11/1994 | Bowen et al. |
| 5,821,944 A | | 10/1998 | Watkins |
| 5,864,512 A | * | 1/1999 | Buckelew et al. ...... 365/230.01 |
| 5,914,722 A | * | 6/1999 | Aleksic ...................... 345/423 |
| 6,184,907 B1 | * | 2/2001 | Min ........................... 345/558 |
| 6,236,408 B1 | * | 5/2001 | Watkins ..................... 345/582 |

FOREIGN PATENT DOCUMENTS

| | | |
|---|---|---|
| DE | 19600431 A1 | 9/1996 |
| GB | 2297018 A | 7/1996 |

OTHER PUBLICATIONS

J.D. Foley, et al., "Grundlagender Computergraphik", 1. Ed. Addison–Wesley, 1994, ISBN: 3–89319–647–1; pp 75–82 and 101–106.

* cited by examiner

Primary Examiner—Kee M. Tung
(74) Attorney, Agent, or Firm—Dougherty, Clements, Hofer & Bernard

(57) ABSTRACT

A method for rasterizing a graphic primitive (120) in a graphics system generates, starting from graphic primitive description data, pixel data for the graphic primitive, the graphics system comprising a memory which is divided up into a plurality of blocks (a, a+1, b, b+1) which are each associated with a predetermined one of a plurality of areas on a mapping screen (114). Each block of the plurality of blocks (a, a+1, b, b+1) is associated with a memory page in the memory. The method includes scanning the pixels associated with the graphic primitive (120) in one of the plurality of blocks (a) into which the graphic primitive extends, repeating the preceding steps until all of the pixels associated with the graphic primitive have been scanned in each of the plurality of blocks into which the graphic primitive extends, and outputting the pixel data.

15 Claims, 12 Drawing Sheets

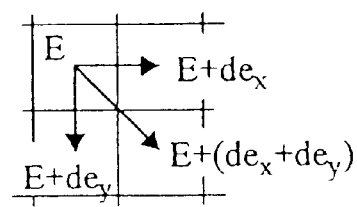
Fig. 3
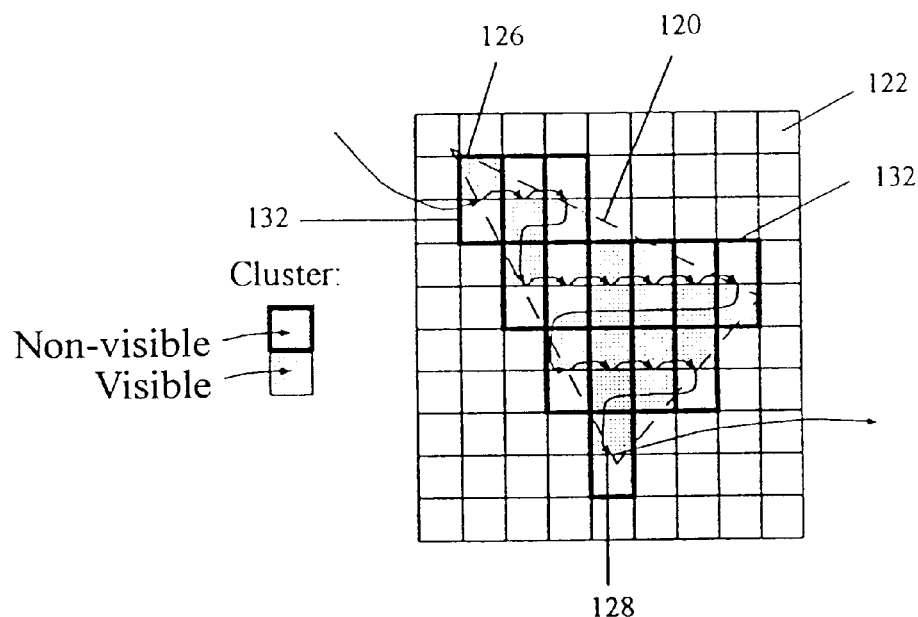
Fig. 4
Fig. 5

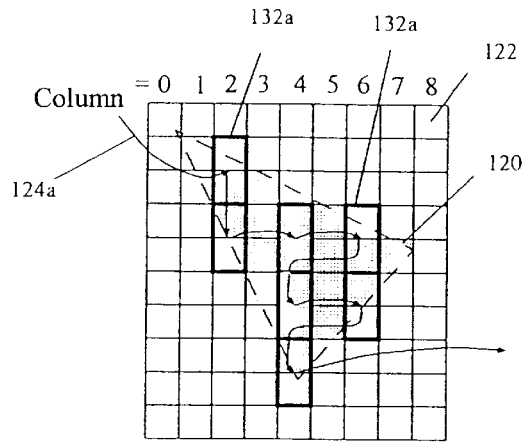
A)
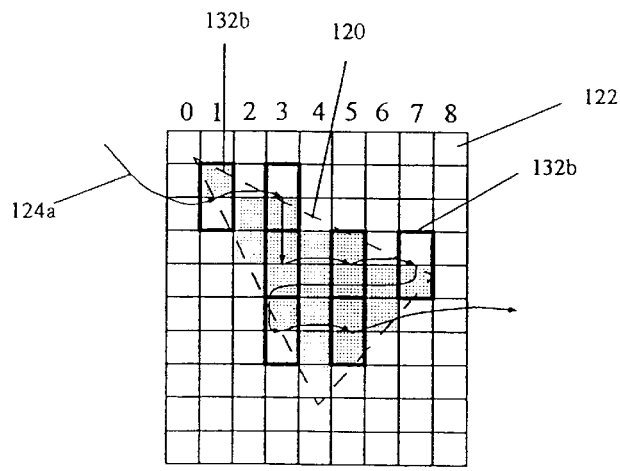
B) Fig. 6
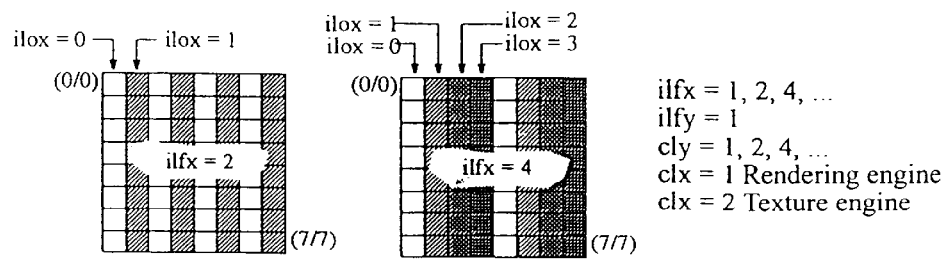
Fig. 7

| ccfx [ccfy] | | | x_start mod clx [y_start mod cly] | | | |
|---|---|---|---|---|---|---|
| | | | 0 | 1 | 2 | 3 |
| clx [cly] | 1 | dir_x [dir_y] 0 | 0 | - | - | - |
| | | 1 | 0 | - | - | - |
| | 2 | dir_x [dir_y] 0 | 0 | -1 | - | - |
| | | 1 | -1 | 0 | - | - |
| | 4 | dir_x [dir_y] 0 | 0 | -1 | -2 | -3 |
| | | 1 | -3 | -2 | -1 | 0 |
| | n | dir_x [dir_y] 0 | ccfx = - (x_start mod clx) ccfy = -(y_start mod cly) | | | |
| | | 1 | ccfx = (x_start mod clx) - (clx -1) ccfy = (y_start mod cly) - (cly -1) | | | |

Fig. 11

| icfx [icfy] | | dir_x = 0 [dir_y =0] | | | | dir_x = 1 [dir_y =1] | | | |
|---|---|---|---|---|---|---|---|---|---|
| | | (x_start/clx) mod ilfx = [(y_start/cly) mod ilfy =] | | | | (x_start/clx) mod ilfx = [(y_start/cly) mod ilfy =] | | | |
| | | 0 | 1 | 2 | 3 | 0 | 1 | 2 | 3 |
| ilox [iloy] | 0 | 0 | 3 | 2 | 1 | 0 | 1 | 2 | 3 |
| | 1 | 1 | 0 | 3 | 2 | 3 | 0 | 1 | 2 |
| | 2 | 2 | 1 | 0 | 3 | 2 | 3 | 0 | 1 |
| | 3 | 3 | 2 | 1 | 0 | 1 | 2 | 3 | 0 |
| | n | icfx=(ilox-((x_start/clx) mod ilfx)) mod ilfx icfy=(iloy-((y_start/cly) mod ilfy)) mod ilfy | | | | icfx=(((x_start/clx) mod ilfx)-ilox) mod ilfx icfy=(((y_start/cly) mod ilfy)-iloy) mod ilfy | | | |

Fig. 12

| Term | Definition |
|---|---|
| scfx | ccfx + clx * icfx, Start correction factor in the x direction |
| scfy | ccfy + cly * icfy, Start correction factor in the y direction |
| el_start' | el_start + scfx * el_dx + scfy * el_dy |
| en1_start' | en1_start + scfx * en1_dx + scfy * en1_dy |
| en2_start' | en2_start + scfx * en2_dx + scfy * en2_dy |
| x_start' | if dir_x = 0 then x_start' = x_start + scfx else x_start' = x_start - scfx |
| y_start' | if dir_y = 0 then y_start' = y_start + scfy else y_start' = y_start - scfy |
| ccnt_start' | ccnt_start - scfx |
| scnt_start' | scnt_start - scfy |

Fig. 13

| Term | Definition |
|---|---|
| ccnt_decr | ccnt - clx * ilfx |
| scnt_decr | scnt - cly * ilfy |
| (cl_x, cn1_x, cn2_x) | (cl, cn1, cn2) + clx * ilfx * (cl_dx, cn1_dx, cn2_dx) |
| (cl_y, cn1_y, cn2_y) | (cl, cn1, cn2) + cly * ilfy * (cl_dy, cn1_dy, cn2_dy) |
| (cl_xy, cn1_xy, cn2_xy) | (cl, cn1, cn2) + clx * ilf * (cl_dx, cn1_dx, cn2_dx) + cly * ilfy * (cl_dy, cn1_dy, cn2_dy) |
| syl | (cl + (clx - 1) * cl_dx + cly * ilfy * cl_dy) >= 0 |
| ssc | scnt_decr >= 0 |
| sxn | ((cn1 + clx * ilf * cn1_dx) >= 0 AND (cn2 + clx * ilf * cn2_dx) >= 0) OR ((cn1 + clx * ilf * cn1_dx + cn1_dy) >= 0 AND (cn2 + clx * ilf * cn2_dx + cn2_dy) >= 0) OR ... ((cn1 + clx * ilf * cn1_dx + (cly -1) * cn1_dy) >= 0 AND (cn2 + clx * ilf * cn2_dx + (cly -1) * cn2_dy) >= 0) |
| scc | ccnt_decr >= 0 |
| eos | if dir_x = 0 then eos = ((x div ilfx) mod stw >= stw - clx) else eos = ((x div ilfx) mod stw < clx) |

Fig. 16

| Movement | Name | Condition |
|---|---|---|
| x direction | horz | (/eos AND sxn AND scc) OR ((eos AND /sf AND sxn AND scc) AND ((/ef AND /syl) OR /ssc)) |
| y direction | vert | (eos OR /sxn OR /scc) AND ssc AND /ef AND syl |
| xy direction | diag | /sxn AND ssc AND /ef AND /syl AND /sf AND scc |
| Edge return | edge | (eos OR /sxn OR /scc) AND ssc AND ef |
| Next strip | strip | (/ssc AND sf AND /sxn AND scc) OR ((eos OR /sxn) AND /ef AND /syl AND sf AND scc) OR (eos AND sf AND /ssc & scc) |
| Next primitive | newp | (/ssc AND /sf AND /(sxn AND scc)) OR (/scc AND /syl & /ef) OR (/scc AND /ssc) |

Fig. 17

| Register | Value to be loaded | Condition |
| --- | --- | --- |
| (el, en1, en2) | (el_x, en1_x, en2_x) | horz |
| | (el_y, en1_y, en2_y) | vert |
| | (el_xy, en1_xy, en2_xy) | diag |
| | (el_edge, en1_edge, en2_edge) | edge |
| | (el_strip, en1_strip, en2_strip) | strip |
| | (el_start, en1_start, en2_start) | newp |
| (el_edge, en1_edge, en2_edge) | (el_y, en1_y, en2_y) | horz AND syl AND /ef |
| (el_strip, en1_strip, en2_strip) | (el_x, en1_x, en2_x) | (vert OR edge) AND sxn AND scc AND /sf |
| ccnt | ccnt_decr | horz OR diag |
| | ccnt_edge | edge |
| | ccnt_strip | strip |
| | ccnt_start | newp |
| ccnt_edge | ccnt | horz AND syl AND /ef |
| ccnt_strip | ccnt_decr | (vert OR edge) AND sxn AND scc AND /sf |
| scnt | scnt_decr | vert OR edge OR diag |
| | scnt_strip + scnt | strip |
| | scnt_start | newp |
| scnt_strip | 1 | (vert OR edge) AND sxn & scc AND /sf |
| | scnt_strip + 1 | (vert OR edge) AND sxn AND scc AND sf |
| ef | 1 | syl AND horz |
| | 0 | /(syl AND horz) |
| sf | 1 | (vert OR edge) AND sxn AND scc |
| | 0 | strip OR newp OR diag |

Fig.18

| Scan command | Condition | Comment |
|---|---|---|
| track_x | horz AND /ef | go to the next pixel in the scan line, track edge return position |
| inc_x | horz AND ef | go to the next pixel in the scan line, secure edge return position |
| track_y | (vert OR edge) AND /sf | go to the edge entry position, track strip entry position |
| inc_y | (vert OR edge) AND sf | go to the edge entry position, secure strip entry position |
| track_xy | diag | go diagonally, secure no return position |
| jump | strip | go to the strip entry point |
| load | newp | go to the next primitive |

Fig. 19

$vis(cofs, rofs) = (el + cofs * el\_dx + rofs * el\_dy) >= 0$ AND
$(en1 + cofs * en1\_dx + rofs * en1\_dy) >= 0$ AND
$(en2 + cofs * en2\_dx + rofs * en2\_dy) >= 0$ AND
$(ccnt - cofs) >= 0$ AND $(scnt - rofs) >= 0$

A)

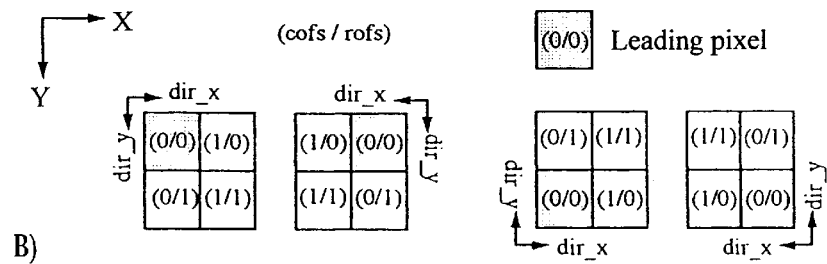

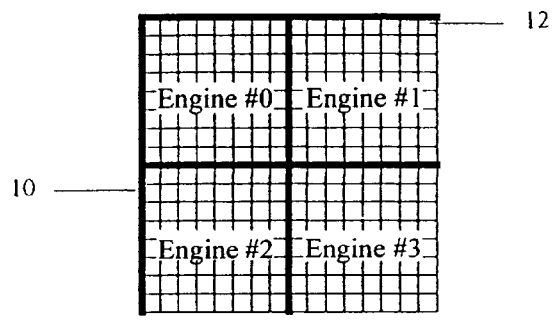
A)
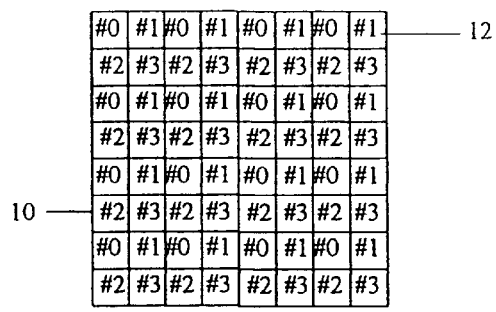
B)
Fig.21
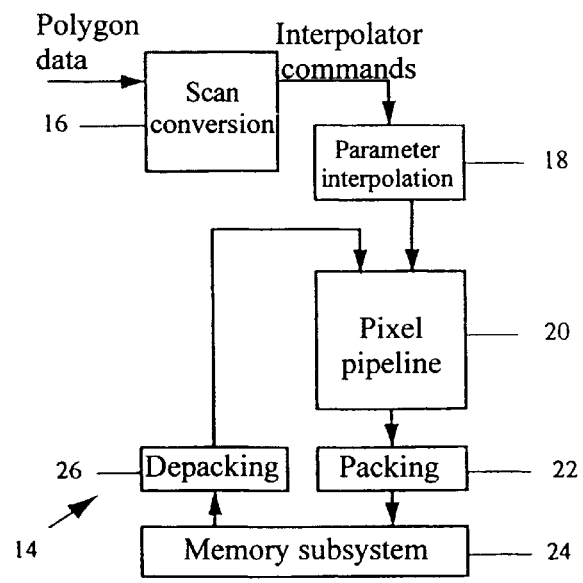
Fig. 22

METHOD FOR RASTERIZING A GRAPHICS BASIC COMPONENT

FIELD OF THE INVENTION

The present invention relates to a method for rasterizing a graphic primitive and, in particular, to an accelerated method for rasterizing a graphic primitive in a graphics system in order to generate pixel data for the graphic primitive from graphic primitive description data.

BACKGROUND OF THE INVENTION AN DESCRIPTION OF THE PRIOR ART

For accelerating the process of image-rendering of three-dimensional images, it is known to use multi-processors or hardware pipelines in parallel. Each of these units acts upon a sub-set of the information contained in an entire image, as has been described by James D. Foly et. al in "Computer-graphic Principles and Practice", second edition, 1990, pages 887 to 902. This task can be divided up by either processing, in parallel, objects (polygons) in the image, or by processing certain sections of the image in parallel. Mere implementation of the division of objects leads to a subdivision of the object level description of a scene (vertex list), so that each of the processors is equally loaded. This division is carried out independently of the arrangement of the respective objects in the three-dimensional world or in a frame buffer.

The implementation of the division of the task by forming sections in an image is effected by subdividing a frame buffer into sub-sections which normally have the same size. With regard to dividing the frame buffer, there is the possibility of either associating the same with large, continuous pixel blocks or of effecting the association in an interleaved manner.

FIG. 21 shows the above-described possibilities of partitioning a frame buffer with regard to the case of a graphics system operating with four graphics processing engines. FIG. 21a shows the association of large continuous pixel blocks to the respective graphics processing engines. As can be seen, in this exemplary case, the frame buffer 10 is subdivided into four equallysized blocks which are associated to the engines. FIG. 21b shows the interleaved frame partitioning of the frame buffer 10, and it can be seen that the processing of the individual pixels 12, which are represented by the boxes in FIG. 21, is effected in an interleaved manner by the four graphics processing engines of the graphics system.

Interleaved partitioning is used very frequently, since it offers the advantage that the workload of the individual processors is automatically balanced. Except for the smallest polygons, all polygons are located in all partitions of the frame, so that almost every image renderer is supplied with the same number of pixels. Interleaved frame buffer partitioning is also referred to as "distributed frame buffer".

FIG. 22 shows a block diagram of a conventional graphics system having a pipeline for pixel processing. The graphics system, in its entirety, is denoted by reference numeral 14 and includes a scan converter 16 receiving, at its input, data which write onto the graphic primitive, e.g., a polygon, to be processed. The scan converter 16 processes the received data and produces, at its output, interpolator commands which are entered into a parameter interpolator 18. The output of the parameter interpolator 18 is connected to a first input of a pixel pipeline 20. The output of the pixel pipeline 20 is connected to a memory subsystem 24 via a packing unit 22.

Data from the memory subsystem 24 are supplied to the second input of the pixel pipeline 20 via a depacking unit 26.

FIG. 23 shows a block diagram of a conventional graphics system with a plurality of pipelines working in parallel. The graphics system, in its entirety, is denoted by reference numeral 28, and identical or similar elements, such as in the system in FIG. 22, are provided with the same reference numerals. Unlike the graphics system illustrated in FIG. 22, the scan converter 16 is designed as a parallel scan converter and, similarly, the parameter interpolator 18 is designed as a parallel parameter interpolator. This parallel parameter interpolator 18 has a plurality of outputs for supplying data to a plurality of pixel pipelines $20_0$–$20_n$, outputs of the pixel pipelines being connected with the packing unit 22. The depacking unit 26 is connected with the second inputs of the respective pixel pipeline $20_0$–$20_n$.

Parallel image processing using interleaved frame partitioning constitutes a very suitable method for hardware implementation of image-rendering pipelines, as shown in FIG. 23. The memory subsystem 24 typically manages so-called memory words containing a plurality of pixels. A 128-bit word, for example, contains four color pixels (true color pixels), with each pixel including 32 bits. The memory subsystem 24 can either read or write such a word during a clock cycle. In a graphics system having a single pixel pipeline, such as is shown in FIG. 22, the depacking unit 26 must, for fragment calculation (e.g., texture fade-overs, reflecting additions, target fade-overs, dithering, raster operations, and the like), extract one pixel per clock and convert it into the internal color format. Packing unit 22 converts the results of the pixel pipeline calculation into the color format stored in the memory and unites several pixels to form one memory word.

Systems having several image-rendering pipelines, as are shown in FIG. 23, can process, in parallel, several pixels contained in one memory word. If the number of pixel pipelines is equal to the number of pixels per memory word, packing and depacking the same becomes trivial.

Graphics processing systems mostly use image-rendering engines whose primitives are polygons. In addition, these polygons are limited to certain types, such as triangles or quadrilateral elements. More complex polygons can then be defined using these graphic primitives.

The basic challenge in processing graphic primitives is that determining whether a point in a screen area is within or outside the graphic primitive to be rendered must be as simple as possible. For triangles, this can be achieved, for example, in that the three edges forming the graphic primitive are written onto by means of linear edge functions.

FIG. 24 shows an example of a linear edge function. In the Cartesian co-ordinate system in FIG. 24, an edge 30 of a graphic primitive is illustrated by way of example, and the starting point and the end point, respectively, of the edge are determined by the co-ordinates $x_0$ and $y_0$ and $x_1$ and $y_1$, respectively.

It can be determined by the edge function indicated in the right-hand section of FIG. 24 whether a point within the Cartesian co-ordinate system is located to the left or the right of the edge or on the edge. Point P is located on the edge 30 and, in this case, the value for the edge function is 0. Point Q is located to the right of edge 30 and, in this case, the result of the edge function is larger than 0, whereas for point R, which is located to the left of edge 30, the result of the edge function is smaller than 0. In other words, each of the linear edge functions yields a value of 0 for co-ordinates which are located exactly on the edge or on the line, a positive value for co-ordinates located to one side of the line or edge, and a negative value for co-ordinates located to the other side of the line or edge. The sign of the linear edge function subdivides the drawing surface into two half-planes.

Linear edge functions are further described in the following articles: J. Pineda "A Parallel Algorithm for Polygon Rasterisation" Seggraph Proceedings, Vol. 22, No. 4, 1988, pages 17 to 20; H. Fuchs et. al, "Fast Spheres Shadows, Textures, Transparences, and Image Enhancements in Pixel-Planes"; Seggraph Proceedings, Vol. 19, No. 3, 1985, pages 111 to 120; Dunnet, White, Lister, Grinsdale University of Sussex, "The Image Chip for High Performance", IEEE Computer Graphics and Applications, November 1992, pages 41 to 51.

By multiplying the edge functions with the value of −1, the sign for the half-planes can be inverted, and the edge function can further be normalized for indicating a distance of a point from the edge, as has been described by A. Schilling in "A New, Simple and Efficient Antialiasing with Subpixel Marks", Seggraph Proceedings, Vol. 25, No. 4, 1991, pages 1, 2, 3 to 141. This is useful, in particular, for pixel overlap calculations for performing edge antialiasing (antialiasing=measure for reducing image distortions).

The linear edge functions are calculated incrementally from a given starting point, which is particularly desirable for hardware implementations, since this offers the possibility of merely using simple adders instead of costly multipliers. FIG. 25 shows an example of edge function increments, wherein the starting point is denoted by E, $E+de_x$ indicates the incrementation in the x direction, and $E+de_y$ indicates the incrementation in the y direction. The right-hand part of FIG. 25 describes the determination of the incremental values of $de_x$ and $de_y$, respectively. If the edge function is, itself, normalized or inverted, it is required to also normalize and invert the delta values for the incremental steps, indicated in FIG. 25.

For a triangle, the three edge functions can be arranged such that all three edge functions supply positive values only for such co-ordinates which are located within the triangle. If at least one edge function yields a negative value, the co-ordinate in question, i.e., the pixel in question, is located outside the triangle. FIG. 26A shows the sign distribution for the three edges 30a, 30b, 30c of a triangle-shaped graphic primitive 32. The boxes 12 shown in FIG. 26 each illustrate an illustratable pixel. As can be seen, the edge functions for the edges 30a to 30d yield a negative value whenever the co-ordinate is located outside the graphic primitive 32, and a result with a positive sign is output only when the co-ordinate is located within the same.

Typically, the scan conversion hardware obtains the edge function values of all three edges for a given starting point together with the delta values for the x and y directions, so as to enable incremental calculation of the successive co-ordinates. With each clock, the scan converter advances by one pixel in the horizontal direction or by one pixel in the vertical direction. FIG. 26B shows a potential traversing algorithm for passing through the triangle 32 already shown in FIG. 26A. The scan path is shown in FIG. 26B and, as can be seen, the triangle is passed through up to the last pixel 36 in the manner shown, starting from a starting pixel 34. From here, the algorithm jumps to a further graphic primitive to be processed. In traversing the graphic primitive, edge function values for older positions can be stored so as to enable a return to the same or to their neighbors. The aim is to consume as few clock cycles per triangle as possible or, in other words, to avoid the scanning of pixels outside the triangle, which will be referred to as invisible pixels in the further course of the description. For example, a simple method might consist in traversing all pixels which are contained within the enclosure triangle of the graphic primitive and in verifying the same with regard to their visibility. This would evidently mean that at least 50% of non-visible pixels would have to be traversed. In contrast to this, the algorithm shown in FIG. 26B is developed further, after it has scanned the triangle on a scan line-by-scan line basis, with a leading edge of the triangle being tracked. The leading edge of the triangle is that which exhibits the largest extension in a direction perpendicular to the scanning direction or to the scan line. With most triangle forms, traversing invisible pixels to a large extent is thereby avoided, and the percentage of scanned invisible pixels rises only for very narrow triangles.

The scan lines may be defined either horizontally or vertically or even with changing orientations, depending on the triangle to be examined. In practice, it is expedient to restrict scan conversion to horizontal scan lines, as this aligns the scan with the display-refreshing scan and, moreover, a memory access can typically be optimized only for one scan axis. If the scan lines are horizontally defined, the leading edge of the triangle is defined by the two vertices exhibiting the largest difference regarding their y co-ordinates. In order to assure symmetrical behavior after rasterization or scan conversion, it is desirable to change the vertical and horizontal scanning directions as a function of the inclination of the leading edge and as a function of the orientation of the triangle, respectively. FIG. 27 shows different scanning directions for different types of triangles. As can be seen, for the triangle of type A, the horizontal scanning direction is defined in the positive x direction, and the vertical scanning direction is defined in the positive y direction. For the triangle of type B, the horizontal scanning direction is defined in the negative x direction, and the vertical scanning direction is defined in the positive y direction. For the type C triangle, the horizontal scanning direction is defined in the positive x direction, and the vertical scanning direction is defined in the negative y direction, and for the type D triangle, the vertical scanning direction is defined in the negative y direction, and the horizontal scanning direction is defined in the negative x direction.

In the following, a more detailed description will be given of the memory subsystem mentioned with regard to FIGS. 22 and 23. Known graphics systems typically use dynamic random access memories (e.g., synchronous DRAMs) for frame buffer storage. After the performance of the rasterizer has been determined by the memory bandwidth, it is desirable to communicate with the memory in an efficient manner.

Large frame buffers (e.g., 1600×1280×32 bits-8M bits) can be accommodated in only a small number of memory components. For assuring an adequate bandwidth, the memory is accessed via a broad path, and the same is limited only by the number of inputs/outputs (I/Os) present at the connection between the graphics chip and the memory (e.g., 128 data bits). Using modern technologies, such as double data rate transmission, frame buffers having bandwidths of more than 2 GByte/sec per graphics control can be achieved. However, this bandwidth is not available for the entirely random access.

A DRAM array consists of rows and columns, and access within one row (page) to varying columns will normally be very fast. Synchronous DPAMs can transfer data in each clock cycle, provided that they remain in the same row. Passing to a different row is equivalent to consuming several clock cycles for closing the old column and opening the new one.

These cycles cannot be utilized for actual data transmission, so that the overall bandwidth is reduced. In order to minimize this effect, modern DRAMs contain some, 2 to 4, memory banks in which different rows may be open. An efficient image rendering system must take these properties into account in order to be able to yield optimum performance.

A known technique in memories is referred to as "memory tiling", i.e., the subdivision of the memory into blocks or blocks. In this case, rectangular-shaped areas of a mapping screen are mapped to blocks (blocks) in the memory. Small triangles have a tendency to completely fall into one block, which means that these do not lead, during image rendering, to page defaults in accessing the memory. The graphics systems properties for processing triangles which intersect several blocks, i.e., which extend over several blocks, can be enhanced by mapping adjacent blocks onto different memory banks in the form of a chessboard. One example of a potential memory partitioning is shown in FIG. 28, in which each block has a size of 2 Kbytes.

From U.S. Pat. No. 5,367,632, a graphics system is known which has a plurality of graphics rendering elements arranged in the manner of pipelines, each pipeline being associated with a rasterization with a corresponding memory. The individual memories are conventional memory elements which per se each form a frame buffer for the respective pipeline. The memories are not arranged in any specific organization.

U.S. Pat. No. 5,821,944 describes "memory tiling", wherein a screen area, onto which a graphic primitive is to be mapped, is subdivided into a plurality of fields or blocks. Specification of the blocks is followed by a two-step scan, and it is established which of the blocks comprise a portion of the graphic primitive to be processed. Subsequently, the blocks which have just been determined are scanned in the second step. The individual blocks are selected so as to be associated with corresponding memory areas, the memory areas associated with the respective blocks being filed in a cache memory during the processing.

The graphics systems known from the prior art for processing three-dimensional images are disadvantageous, however, in that optimum utilization of the memory capacities is not ensured. For this reason, and on the grounds of the rasterization methods known from the prior art, the performance of these systems is limited.

SUMMARY OF THE INVENTION

It is the object of the present invention to provide a method for rasterizing a graphic primitive which exhibits increased performance compared with the methods known in the prior art.

In accordance with a first aspect, the present invention provides a method for rasterizing a graphic primitive in a graphics system for generating pixel data for the graphic primitive, starting from graphic primitive description data, with the graphics system having a memory divided up into a plurality of blocks, each of which is associated with a predetermined one of a plurality of areas on a mapping screen. In a first step, the pixels associated with the graphic primitive are scanned in one of the plurality of blocks into which the graphic primitive extends, and this step is repeated until all pixels associated with the graphic primitive have been scanned in each of the plurality of blocks into which the graphic primitive extends. Subsequently, the pixel data obtained are output for further processing.

In accordance with a second aspect, a method for rasterizing a graphic primitive in a graphics system is provided for generating pixel data for the graphic primitive, starting from graphic primitive description data, the graphics system including a plurality of graphics processing pipelines. Initially, a plurality of adjacent pixels are simultaneously scanned, with the adjacent pixels forming a cluster, at least one of the plurality of adjacent pixels being associated with the graphic primitive, and with the number of the pixels being simultaneously scanned depending on the number of graphics processing pipelines in the graphics system. Subsequently, this step is repeated until all pixels associated with the graphic primitive have been scanned, and, finally, all the pixel data are output.

The present invention is based on the realization that the performance of graphics processing systems can be increased in that, on the one hand, the graphic primitives to be scanned are traversed in an "intelligent" manner and/or that, on the other hand, the performance of the system is increased by a further parallelization of data processing.

In accordance with the present invention, a method is taught which implements a "monolithic algorithm" in which all of the aspects explained above can be used together, individually or in any combination so as to increase the system's performance. This results in a "scalable architecture" of the graphics processing means to be used.

Several image-rendering pipelines are supported on one individual chip such that each of the same processes a different pixel of a memory word. This requires that the parallel scan converter functions in an operating mode referred to as locked scan. This means that the pixels processed in parallel always have a fixed geometric relationship with one another (pixel cluster). This facilitates hardware implementation with regard to the memory subsystem. Furthermore, this enables application of the method to chips with several image-rendering pipelines, independent of the chip layout.

A further advantage of the method is that it is possible to combine several individual chips (see above) in one system so as to increase the performance thereof with each chip added. In addition, different chips in the system may serve to fulfil different tasks and to process a different number of pixels, i.e., clusters of different sizes, in parallel. In this case, it is not necessary for the scan converters of the parallel image-rendering chips in the system to be interlocked, since each of same has its own frame buffer memory, and the supply of the polygon data can be decoupled using FIFOs.

A further advantage of the present invention consists in memory utilization. Memory utilization mainly depends on the efficiency of memory control and the memory decision circuit (arbitration circuit). However, even with an ideal memory interface unit, the randomness of the pixel accesses may ruin memory utilization, in particular when scanning small triangles, this effect being even further aggravated in parallel image rendering, where the triangles are subdivided into smaller sections. This problem is avoided in accordance with the present invention, since the same is based on the realization that the number of page defaults per triangle can be minimized in the event that the scan converter has knowledge with regard to mapping the screen areas onto the memory address area (tiling). Further, the average number of memory banks which are simultaneously open may also be reduced which, again, reduces potential collisions in systems where several requests (texture reading operation, graphics rendering engine reading/writing operation, display screen reading operation) are effected with regard to a shared memory element (linked memory).

Another advantage of the present invention is that the efficiency of cache storage of texture data can be improved by the method in accordance with the invention. Typically, bi-linear or tri-linear filtering is used for texture mapping. Without latching the texture data, four (bi-linear filtering) or even eight (tri-linear filtering) unfiltered texels become necessary which would have to be provided by the memory subsystem per pixel. A texture cache memory can benefit from the fact that adjacent texels can be reused during the passing of a scan line. The extent of the reuse strongly depends on the magnification/reduction chosen and is significant if a suitable MIP-map level is selected. Within one scan line, only a very small texture cache memory is required in order to benefit from this advantage. In order to reuse the adjacent texels of a previous scan line, however, the texture cache memory must contain a complete scan line of the texels. In practice, a cache memory size will be selected which is capable of storing scan lines for triangles or graphic primitives of an average size, whereby the efficiency for larger triangles somewhat decreases. In this connection, a further advantage of the present invention is that a maximum length of a scan line can be guaranteed by the scan converter, so that the cache memory can be accurately dimensioned and is normally considerably smaller than that required for storing scan lines for average triangles.

BRIEF DESCRIPTION OF THE DRAWINGS

In the following, preferred embodiments of the present invention will be explained in more detail with reference to the attached drawings, in which:

FIG. 3 is an illustration of the inventive rasterization method in accordance with a second embodiment;

FIG. 4 is an illustration of the inventive rasterization method in accordance with a third embodiment;

FIG. 5 is a table which shows dimensions for different clusters that may be used in accordance with the third embodiment;

FIGS. 6A and 6B are an illustration of the inventive rasterization method in accordance with a fourth embodiment;

FIG. 7 is an example of an interleaving scheme in a graphics system in accordance with FIG. 1;

FIG. 11 is a table for determining the cluster correction factors;

FIG. 12 is a table for determining the interleaving correction factors;

FIG. 13 is a table for determining the starting value correction values;

FIG. 16 is a table showing the results from the determination of FIG. 15;

FIG. 17 is a table showing the movement steps of the scan converter;

FIG. 18 is a table showing the updating regulations for updating the interpolator register in FIG. 14;

FIG. 19 is a table of the scan commands;

FIG. 20A is an example of a visibility calculation;

FIG. 20B shows rows and columns in the visibility calculation;

FIG. 21A is an example of conventional continuous frame partitioning of a frame buffer;

FIG. 21B is an example of conventional interleaved frame partitioning of a frame buffer;

FIG. 22 is a block diagram of a graphics system with a pipeline;

DETAILED DESCRIPTION OF THE PREFERRED EMBODIMENTS

Figure 1:
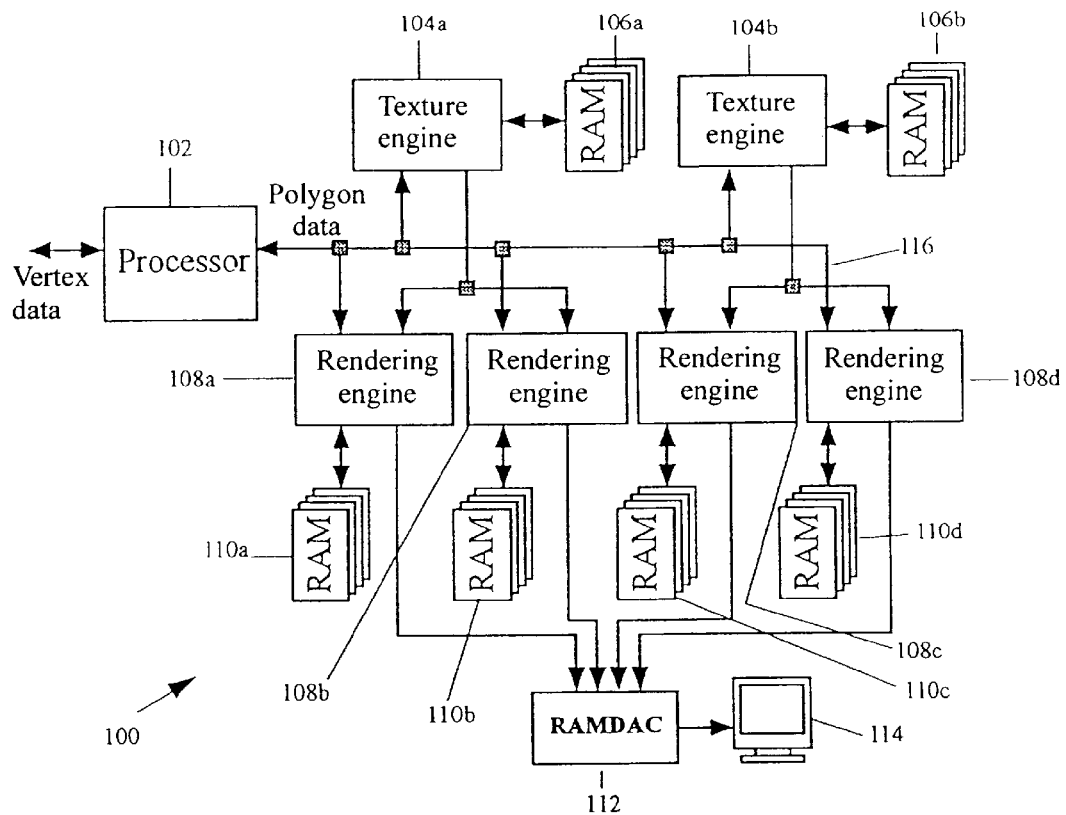
FIG. 1 is a schematic illustration of a graphics system.

With reference to FIG. 1, an example of a graphics system is described in the following in which the method in accordance with the invention is implemented. The graphics system in FIG. 1 is provided, in its entirety, with the reference numeral 100 and includes an adjusting processor 102 which receives, from a superior system, a description of the objects to be represented, e.g. in the form of a vertex list. The processor 102 converts this description to individual data sets for each graphic primitive or polygon. In Example 2 represented, graphics system 100 includes texture engines 104a, 104b, which receive the polygon data from processor 102. Each of the texture engines 104a and 104b is associated with a random access memory 106a and 106b.

The graphics system further includes a plurality of image-rendering engines 108a to 108d which are associated with a memory 110a to 110d, respectively. Imagine-rendering engines 108a to 108d receive, at a first input, the polygon data supplied by the processor 102 and, further, at a second input, the data rendered by the texture engines, with two image-rendering engines 108a, 108b and 108c, 108d being associated with a texture engine 104a and 104b, respectively. The image-rendering engines 108a to 108d are connected to a RAMDAC circuit 112 which effects the necessary digital-to-analog conversion of the signals received for display on a screen 114.

The methods described in accordance with the present invention can be implemented in the graphics system 100 illustrated in FIG. 1, it being pointed out, however, that the present invention is not restricted to the design illustrated in FIG. 1. In order to enhance the understanding of the present invention, the description is effected with reference to the graphics system in FIG. 1. With regard to the individual engines in FIG. 1, it is pointed out that each of the individual engines includes, at its input, a scan converter (not illustrated) which is to be described in more detail later on.

The graphics system illustrated in FIG. 1 is an exemplary architecture for parallel image-rendering using interleaved frame partitioning. It is evident that this architecture may be varied with regard to the number of image-rendering and texture engines involved.

As has already been explained, the processor 102 serves the entire image-rendering subsystem and, in particular, converts the vertex-related object descriptions to individual data sets per polygon. These polygon data are then supplied to the different engines within the system via a common bus 116. The polygon data sets contain the starting values, x and y derivatives for the linear edge functions and for the color values and texture co-ordinates which are interpolated over the triangle. The processor 102 is independent of the number of engines performing the task of image-rendering. Each of the individual engines knows which of the pixels in the interleaving scheme is associated with it.

In the following, the individual aspects of the present invention will be described in detail.

Figure 2:
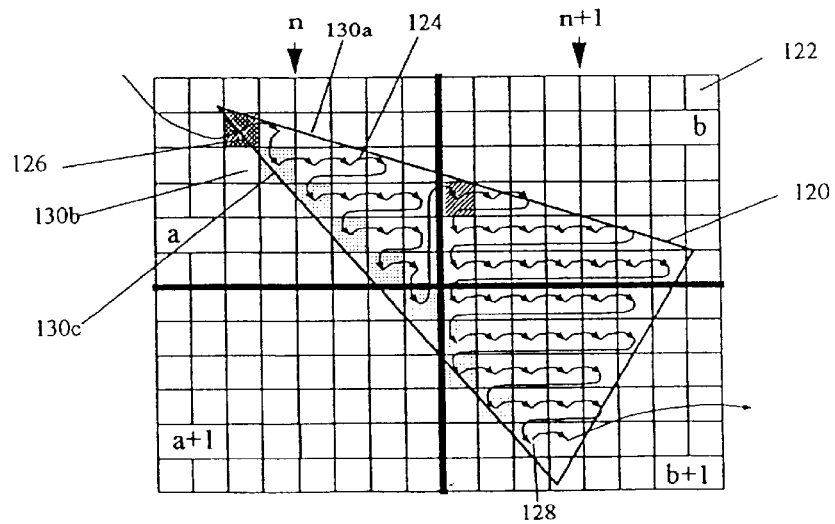
FIG. 2 is an illustration of the inventive rasterization method in accordance with a first embodiment.

With reference to FIG. 2, the so-called strip-based scan conversion is initially described in further detail. FIG. 2 shows a graphic primitive 120 in the form of a triangle extending over a plurality of pixels 122. The boxes shown in FIG. 2 each represent one pixel. The course of the of the scan is represented by the scan line 124 extending from an entry point 126, where a transition is made, for example, from a previous triangle to triangle 120 illustrated in FIG. 2, to an exit point 128, from where a transition is made to a further triangle to be processed.

As can be seen from FIG. 2, the area spanned by pixels 122 is subdivided into four blocks a, a+1, b and b+1. As can further be seen from the course of the scan line 124, those pixels in block a which are associated with triangle 120 are scanned first. Then, a transition is made to a next block, block a+1 in the present case, and the pixels associated with triangle 120 in this block are scanned. In this manner, the individual blocks a to b+1 are scanned.

As can further be seen from FIG. 2, the organization of the individual blocks can be such, in accordance with a preferred embodiment, that blocks a and a+1 are combined to form a first strip n, and blocks b and b+1 are combined to form a second strip n+1. Similarly to the above-described manner, in this case, those blocks which are in a strip n will initially be passed through, and only after all blocks of this strip have been passed through, a change-over is made to the adjacent strip n+1, and there the individual blocks b and b+1 are scanned in the above-described manner. In accordance with this embodiment, a strip is defined as a column of blocks, with the strip being one block wide. A triangle or a graphic primitive 120 extends into one or several of the strips and therefore subdivides the scan lines into fragments. In accordance with a preferred embodiment, one scan line fragment contains no more pixels than are specified by the width of a memory block.

Instead of passing through all scan lines completely and independently of any block boundary, all scan line fragments within one strip are initially processed in accordance with the present invention before one goes onto the next strip—either in a positive or in a negative y direction, depending on the orientation of the triangle. The entry point for the next strip (strip entry position) is detected during the scanning of the current strip. If the scan converter is in the last pixel column at the strip boundary during scanning, the neighboring strip may be examined as to whether visible pixels are still existing.

This is very similar to a preview into the next line during the scanning of the current line for determining the return position from the scan line end (edge return position).

One can also say that at a macro-level, the triangle is passed through on a strip-by-strip and a block-by-block basis, whereas at a micro-level, the triangle is passed through on a scan line-by-scan line and a pixel-by-pixel basis. The primary axis for passing though the strips is the vertical axis, and the primary axis for passing through the scan lines is the horizontal axis.

The advantage of the above-described method is that the number of memory page defaults per graphic primitive may be reduced to the absolute minimum due to the fact that, initially, individual blocks are passed through completely since, during passing through the individual blocks, only one corresponding memory page is accessed. A further advantage is that accesses to all pixels for the graphic primitive in a memory block are successively effected, so that the necessary time during which a page must be held open is reduced. A further advantage is that the duration of the data transmission (bursts) is increased by bundling the accesses to one block, a longer duration of the data transmission enabling the hiding of pre-charge and row activation operations in systems with several memory banks, such as, for example, SDRAMs. A further advantage is that the size of the texture cache memory is reduced due to the shortening of the scan lines.

A further advantage is that, due to the requirement that the entry point must be stored for the next strip, the accompanying increase in the number of gates is only moderate in a hardware realization, i.e., assuming a conventional system of 30 K gates, the present invention requires a system of 35 K gates.

In accordance with a further aspect of the present invention, the performance of the graphics system may be increased by so-called diagonal scanning. In addition to the standard movement directions of "horizontal" and "vertical", the possibility of diagonal steps is added to the system. If there is no need to continue in the current scan line, for example because the next pixel is not visible, and if the pixel in the vertical scanning direction is not visible either, a diagonal step may be carried out. This is expedient in particular for degenerated, small and narrow triangles and leads to savings of approximately 50% of the steps. If average triangle sizes are considered, the savings are smaller (<10%) and actually strongly depend on the average polygon size. In practice, however, a scan conversion hardware must also manage lines in addition to triangles, e.g., for wire frame models, and in this situation, an introduction of the diagonal steps has its advantages.

This approach is further illustrated in FIG. 3. It is assumed that a pixel E is being scanned. Subsequently, it is determined whether a pixel $E+de_x$, which is adjacent in the scanning direction, is associated with the graphic primitive, and it is further determined whether a pixel $E+de_y$, which is arranged, in a direction perpendicular to the scanning direction, adjacently to the pixel E scanned, is associated with the graphics element. If neither pixel $E+de_x$, nor pixel $E+de_y$ are associated with the graphic primitive, pixel $E(de_x+de_y)$, which is adjacent both to pixel $E+de_x$ and to pixel $E+de_y$, is scanned in the next step.

The advantage of this diagonal scanning is that, hereby, the performance of the system is considerable increased in the drawing of lines and, for drawing polygons, an increase in the performance can also be achieved. It is evident that both aspects which have just been described, that is to say, block-by-block scanning and diagonal scanning, may be used in combination. If one considers the example illustrated in FIG. 2 and here, in particular, pixels 130a to 130c, which are adjacent to the point of application 128 in the scanning direction, it can easily be established that neither pixel 130a nor pixel 130b are visible, so that in this case, a diagonal scanning step directly to pixel 130c is expedient.

In the following, a further aspect of the present invention is described with reference to FIGS. 4 and 5, in particular with regard to the so-called cluster scan. The illustration of graphic primitive 120 in FIG. 4 is similar to that in FIG. 2, so that the same reference numerals will be used here for matching elements.

As can be seen in FIG. 4, two vertically adjacent pixels are combined to form a cluster 132, respectively. In the left hand-side of FIG. 4, a cluster 132 is illustrated by way of example in an enlarged representation, with a non-filled-in cluster element representing a non-visible pixel and a filled-in cluster element representing a visible pixel.

As has been mentioned above, several pixels are grouped to form one cluster for the cluster scan, a pixel constituting the smallest unit. The individual clusters are grouped such that those pixels which are simultaneously processed by a parallel graphics processing hardware are combined into one pixel. Parallel processing is effected here in a locked (synchronous) manner. With an exemplary chip comprising a plurality of image-rendering pipelines, it is desirable that a given graphic primitive is passed through in clusters rather than in pixels. The output signal provided by such a parallel scan converter includes movement information for parallel interpolation of the parameters of the pixels contained in the cluster, and a visibility flag for each pixel.

In the example illustrated in FIG. 4, two pixels are combined to form one cluster, with the upper pixel, respectively, in the cluster being processed by a first pipeline, and the lower pixel, respectively, in the cluster being processed in parallel by a second pipeline of the image-rendering unit.

A method by means of which a scan converter passes through a graphic primitive on the basis of a cluster must pass through all clusters which contain one or several visible pixels. Clusters that do not contain any visible pixels are not traversed. Depending on the number of parallel image-rendering pipelines and depending on the memory organization, the optimum cluster size and shape can be selected, as is shown in the table in FIG. 5. In FIG. 5, "clx" refers to the extension of a cluster in the x direction, and "cly" refers to the extension of a cluster in the y direction. Generally speaking, a cluster may include n-adjacent pixels in the scanning direction and m-adjacent pixels in a direction perpendicular to the scanning direction, n and m being greater or equal to one. The number of graphics processing pipelines required is determined by the product of n and m. If the 2×2 cluster in FIG. 5 (table at the bottom right) is considered by way of example, it becomes clear that in such a case, the graphics processing system must comprise an image-rendering unit including four parallel pipelines.

Preferably, all pixels within one cluster are filed in one memory word. In a further preferred embodiment, the forms of the clusters are limited to rectangular shapes and, in this case, the clusters are determined by their pixel width (clx) and pixel height (cly). Preferably, the cluster width and height is limited to 2×2, 4×4, 8×8, 16×16, . . .

The advantage of the cluster scan is that, thereby, locked (synchronous) scanning of a plurality of pixels is supported, and that multiple pixel pipelines can be supplied by means of a single scan converter at negligible additional expense when compared with scanning individual pixels.

In accordance with a further aspect of the present invention which will be described in more detail in the following with reference to FIGS. 6 and 7, the parallelism within a graphics processing system can be further increased by a so-called interleaved scan and, therefore, the performance of such a system can also be increased.

FIGS. 6A and 6B show the graphic primitive 120 which has already been described with reference to FIG. 4 and to FIG. 2, the illustration in FIG. 6A showing the processing by a first graphics processing engine, and FIG. 6B showing the processing by a second graphics processing engine. In this example, similar to FIG. 4, two vertically adjacent pixels are combined to form a cluster, respectively, the first graphics processing engine processing clusters 131a, which are arranged in the even-numbered columns in the example illustrated, and the second engine processing clusters 132b, which are arranged in the odd-numbered columns. Further, FIGS. 6A and 6B show the respective scan lines 124a and 124b which are passed through for scanning the respective pixels.

Several cluster image-rendering units share an image-rendering task with regard to a polygon 120, and depending on the type of the (interleaved) frame buffer organization, polygon 120 is subdivided into columns, rows or both. For the scan converter, this means that the columns/rows not belonging to its image-rendering unit must be skipped. The strategy regarding passing through across the scan line, which has already been described above, and the use of the strip-oriented strategy are maintained. In this case, only the horizontal/vertical steps must skip several pixels or clusters.

For describing the degree of parallelism achieved by means of interleaving in a system, so-called interleave factors ilfx, ilfy are used. Further, the corresponding columns and rows of a cluster are associated with the image-rendering engines via the so-called interleave offsets ilox, iloy.

With regard to the interleave offsets, the following relationships apply:

$0 \leq ilox < ilfx$ $0 \leq iloy < ilfy$.

With a view to the example illustrated in FIG. 6, this means that the scan converter associated with the scan in FIG. 6A comprises an interleave offset of 0 (ilox=0), whereas the scan converter for processing in accordance with FIG. 6B comprises an interleave offset of 1 (ilox=1). In the example illustrated in FIG. 6, the horizontal interleave factor is 2 (ilfx=2), and the vertical interleave factor is 1 (ilfy=1). The vertical interleave offset is equal to 0 (iloy=0) for all engines.

In other words, the interleave plane is proportional to the number of graphics processing engines contained in the graphics system. The cluster constitutes the smallest unit in interleaved scanning, and grouping takes place in accordance with the clusters.

Interleaved scanning, as described above, has the advantage that hereby the use of several independent (unlocked) image-rendering units in a system is supported with hardly any increase in the number of logic gates in a hardware implementation. A further advantage is that by shifting the delta values of the edge function to the left, larger steps can be achieved, specifically either through fixed wiring or by means of multiplexers in a flexible manner.

With reference to FIG. 7, the interleave scheme used in the graphics system illustrated in FIG. 1 is described. There, the four image-rendering engines 108a to 108d are provided which carry out parallel fragment processing. This means that the interleave factor is 4 in the x direction, and 1 in the y direction (iflx=4, ifly=1). Each of the image-rendering engines stores only that part of the frame for which the respective engine is responsible in its memory. The image-rendering engines are provided with textures from two separate texture engines comprising a horizontal interleave factor of 2, and a vertical interleave factor of 1 (ilfx=2, ilfy=1). FIG. 7 shows interleaving for the texture engines on the left-hand side, and interleaving for the image-rendering engines on the right-hand side. Each of the texture engines serves two image-rendering engines and in terms of maintaining balanced performance, this means that the texture engines must provide twice as many pixels per system clock as the image-rendering engines. For the image-rendering engines, clusters are used which have an extension of one pixel in the x direction, whereas for the texture engines, clusters are used which have an extension of two in the x direction, as can be seen from FIG. 7. The corresponding clusters have the same extension in the y direction. This ensures that in each system clock, a sufficient number of pixels is provided to the image-rendering engines. As is illustrated in FIG. 7, the frame buffer among the image-rendering engines is subdivided into columns, and the width of the columns is determined by the width of the image-rendering footprint (the number of clusters of pixels that are processed on a chip in parallel). The interleave factor denotes the spacing between columns served by an image-rendering engine, and the interleave offset denotes that column which is responsible for an image-rendering engine.

The organization into columns simplifies the interface with an external RAMDAC which collects the frame buffer information, converts it to an analog form and outputs it to a monitor. It should be noted that the above-described aspects of the present invention may be used both individually and in any desired combination. This means that the strip-based scanning described by means of FIG. 2 may, of course, also be carried out in the context of cluster scanning, and diagonal scanning may be carried out as well. In this case, diagonal scanning to the next cluster is effected in a similar manner as has been described by means of FIG. 3 if clusters which are adjacent in the scanning direction and perpendicular to the same are not visible.

The same applies to interleave scanning, which may also be carried out in connection with strip-based scanning described with reference to FIG. 2. Diagonal scanning may also be effected in interleave scanning.

Figure 8:
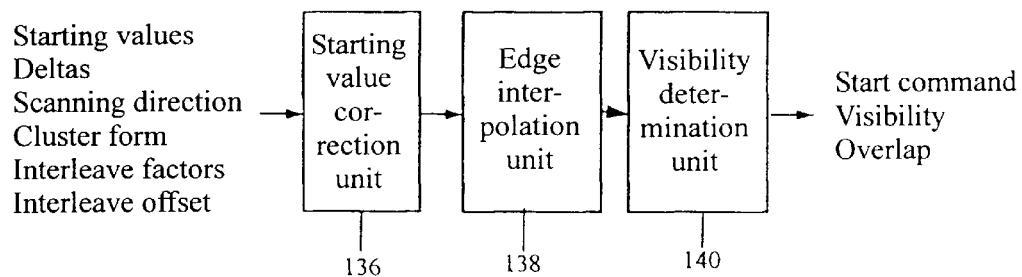
FIG. 8 is a block diagram of a parallel scan converter.

In the following, the steps carried out by a parallel scan converter will be described in more detail with reference to FIGS. 8 to 21. FIG. 8 illustrates an architecture of a parallel scan converter. As can be seen, it essentially contains three blocks, specifically the starting value correction block 134, the edge interpolator block 136, and the visibility determination block 140. The polygon or graphic primitive data arrives at the parallel scan converter in a homogeneous form based on linear edge functions, and in the first stage 136, the starting values are set to a valid starting position for the particular image-rendering engine, and also for a selected pixel in this cluster. Starting from this starting position, the edge interpolator passes through the polygon, one cluster being contacted per clock cycle. Invisible clusters are avoided.

Finally, for each pixel contained in the cluster, visibility bits are calculated in block 140, which indicate whether or not the pixel concerned is associated with the triangle or graphic primitive.

In the following, the individual stages 136 to 140 will be described in more detail.

Figure 27:
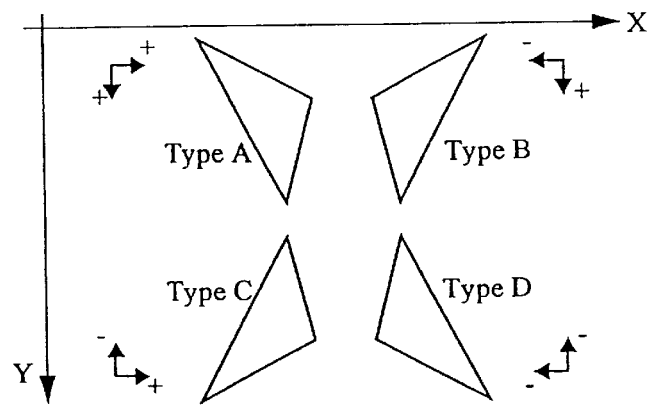
FIG. 27 is an illustration of the scanning directions for different triangles.
Figure 28:
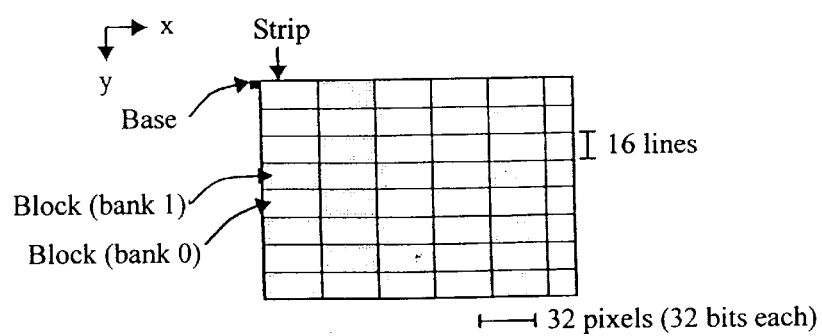
FIG. 28 is an example of a memory which is divided up into blocks of equal size.

It shall be assumed that processor 102 (FIG. 1) generates the following homogeneous data set for each graphic primitive or triangle, irrespective of whether cluster scanning or interleave scanning is carried out. This homogeneous data set contains:

an x/y location of a starting point (x start, y start);

linear edge-function values for this starting point (el start, en1 start, en2 start), the horizontal and the vertical scanning directions which are determined based on the orientation of the triangle (see FIG. 27) (dir x, dir y: 0=scanning in the direction of ascending co-ordinates, 1=scanning in the direction of descending co-ordinates), x/y incremental values for all three edges, so as to enable a movement by one pixel in the horizontal/vertical, given scanning direction (e1-dx, e1-dy, en1-dx, en1-dy, en2-dx, en2-dy); and a delimiting description relative to the starting point, specifically a row and an over-voltage count which specifies the active columns/rows, starting from the starting point, in the scanning direction (ccnt start, scnt start, negative for pixels outside the delimitation).

Figure 9:
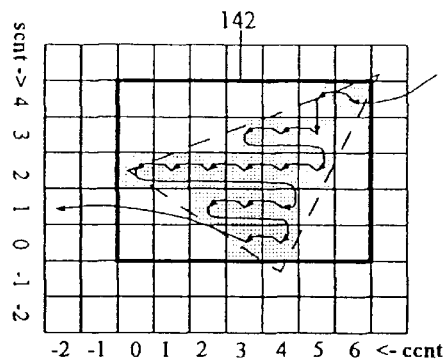
FIG. 9 is an illustration of the active rows/columns in the illustration of a graphic primitive.

The specification of the delimitation area is further illustrated by FIG. 9 and, in this case, the parameter dir-x is equal to 1, and dir-y is equal to zero. The active area is denoted by the reference numeral 142.

Further, it shall be assumed that each image-rendering means contains a static data set of the following system information:

system interleave factors in the x/y directions (ilfx, ilfy);

interleave offsets within the system (ilox, iloy);

cluster dimensions (clx, cly), and memory strip width in pixels (stw).

In a first step, the starting values received are initially corrected, a cluster correction being initially effected.

Figure 10:
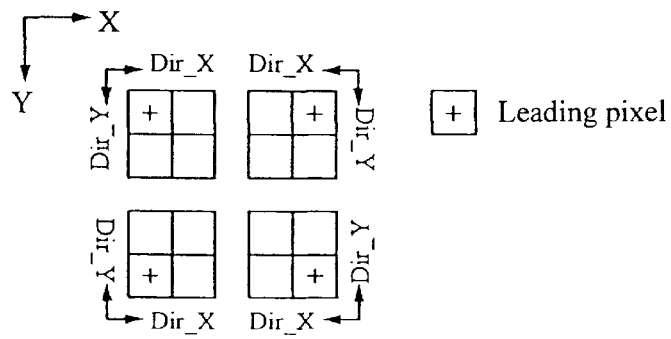
FIG. 10 is an illustration of the determination of a leading pixel in a cluster.

The idea behind cluster scanning is to not interpolate the edge functions for all pixels within a cluster, but to use only one selected pixel instead. The starting position, which is determined by processor 102, is not necessarily the ideal position for carrying out an interpolation during the passing through of a triangle. It has proven advantageous, for reasons of symmetry during the determination of movement, to set the starting position to a so-called "leading pixel" within the cluster. The leading pixel is defined as that pixel which has the highest span and column count within the cluster, which is, thus, the nearest pixel in the scanning direction. The determination of the leading pixel for the four possible combinations of horizontal/vertical scanning directions is illustrated in FIG. 10 for a 2×2 cluster.

The cluster correction factors in the x and y directions (clfx, clfy) are calculated by comparing the x/y co-ordinates of the given starting point with the desired interpolation position of the leading pixel. The cluster correction factors may either by zero or negative, and their absolute values are always smaller than the cluster propagation in the particular direction. FIG. 11 shows a table which explains the determination of the cluster correction factors.

In addition to correcting the clusters, an interleave correction must be carried out, since each image-rendering engine may pass through only those clusters associated with it in accordance with the interleaved frame buffer map. Since the starting point determined by processor 102 may be located within a cluster associated with a different image-rendering engine, a determination must be made for each image-rendering engine of that first cluster in the positive scanning direction which is responsible for same, and the starting point must be set to a pixel in this cluster.

The interleave correction factors (icfx, icfy) are calculated by comparing the x/y co-ordinate of the starting point with the interleave offsets associated with the image-rendering engine. The values of the interleave correction factors are positive and range from 0 to the interleave factor minus one. The table in FIG. 12 illustrates the calculation of the interleave correction factors.

After the corresponding correction factors have been calculated, same are consolidated to form general starting correction factors (scfx, scfy) which are then applied to all starting values in units of the interpolation deltas. The table in FIG. 13 shows the starting value correction to be carried out, with the factors which are listed in the left-hand column and provided with an apostrophe representing the corrected starting points, respectively.

Figure 14:
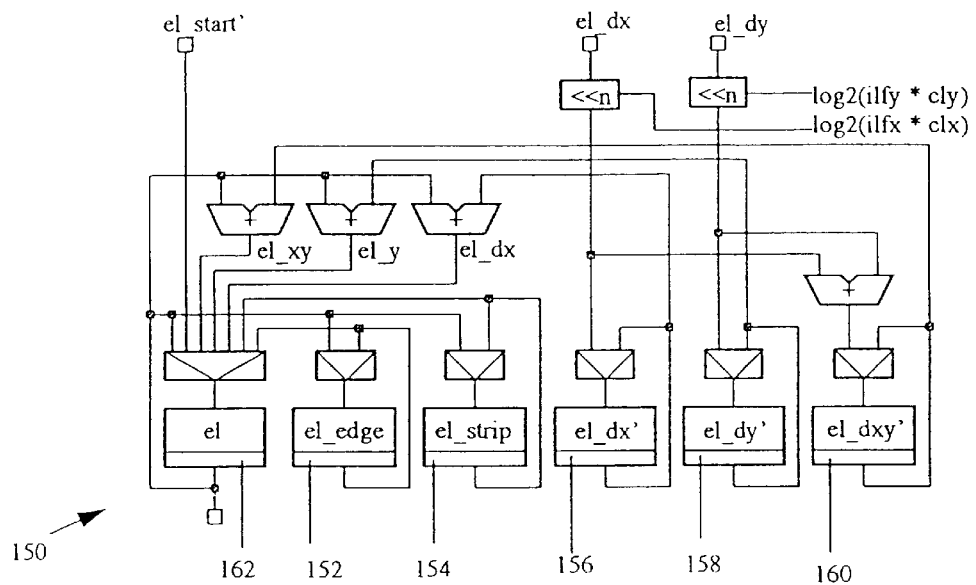
FIG. 14 is a block diagram of an edge interpolator for a leading edge.

After the necessary starting value correction has been carried out, subsequently, edge interpolation is carried out in block 138, the linear edge functions being incrementally calculated starting from the corrected starting point and using an interpolator as shown in FIG. 14.

In FIG. 14, the interpolator, in its entirety, is provided with reference numeral 150. Interpolator 150 enables the storing and restoring of the edge function values for edge return positions (e1-edge) in register 152, and of the strip entry positions (e1-strip) in register 154. Further, the horizontal, vertical and diagonal incremental values (e1-dx, e1-dy, e1-dxy) are stored in registers 156, 158 and 160. The incremental values stored in these registers are added to the working register (e1) 162. At the start of the scanning of a graphic primitive, working register 162 is loaded with the edge function value at the starting point, and the incremental value registers 156 to 160 are loaded with the corrected delta values.

Three such interpolators are used, one per edge, which leads to a total number of nine edge function interpolators per scan converter. The multiplexers of the edge interpolator are controlled by the movement determination logic.

A similar structure as that shown in FIG. 14 is used for column and span count interpolation. Depending on the direction in which the interpolator moves, either zero or the spacing in pixels to the next leading pixel owned by the system is subtracted from the current column or span count.

In addition to the interpolation, it must, of course, also be established whether adjacent pixels which are still to be scanned have exceeded an edge of the graphic primitive and are, therefore, not visible.

For determining the movements of the interpolator, it is important to know when at least one pixel of an adjacent cluster in the next scan line has exceeded the leading edge. Since the orientation of the leading edge relative to the scanning direction is known, only a specific pixel, that is, the nearest pixel in the y direction and the most remote pixel in the x direction within this cluster must be tested with regard to its traversing of the edge.

In addition, it must be established whether a subsequent cluster in the current scan line has fully exceeded an non-leading edge. In this case, it is sufficient to verify a pixel column (the nearest one in the x direction) within this cluster, with a view to exceeding the non-leading edges.

Figure 15:
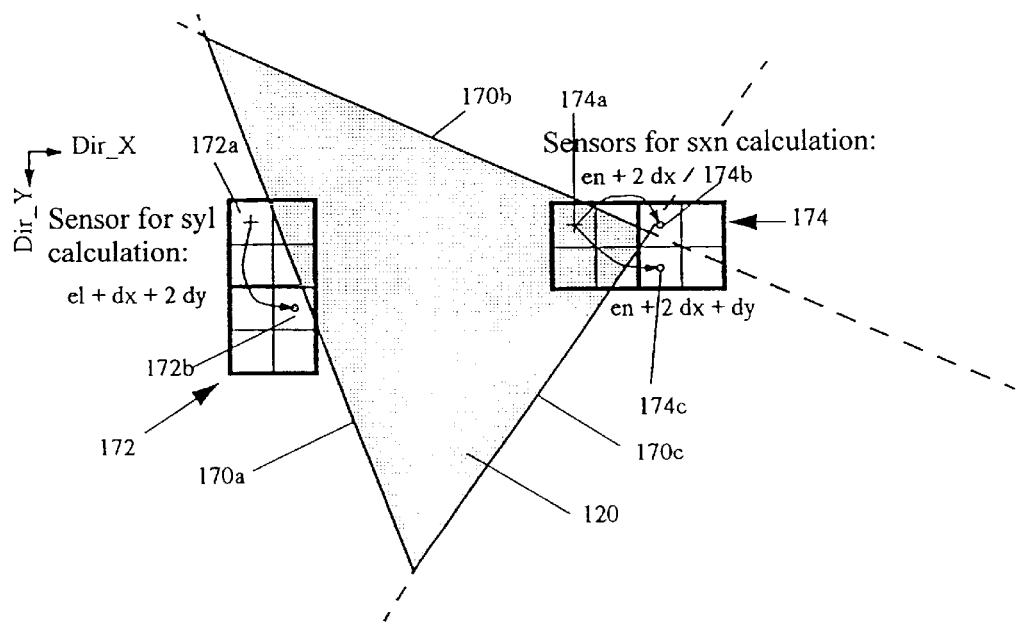
FIG. 15 is an illustration of the determination of the exceeding of an edge of a graphic primitive.
Figure 23:
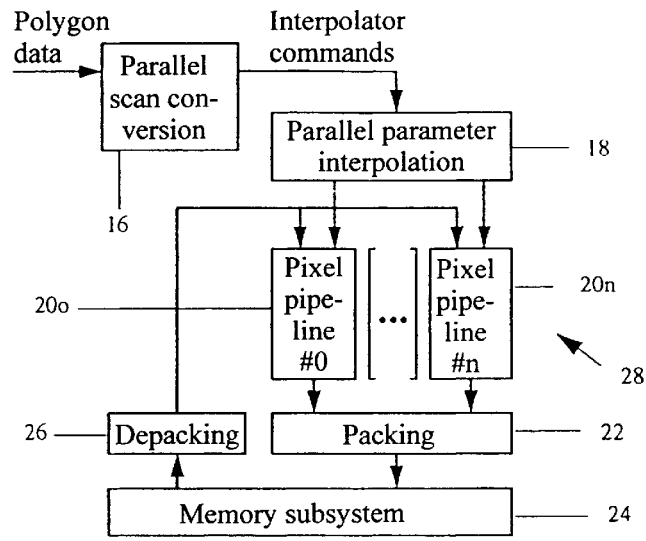
FIG. 23 is a block diagram of a graphics system with parallel pipelines.
Figure 24:
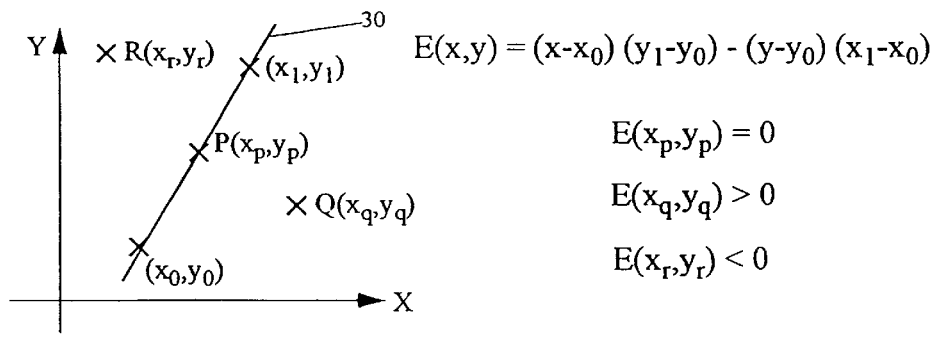
FIG. 24 is an example of a linear edge function.
Figure 25:
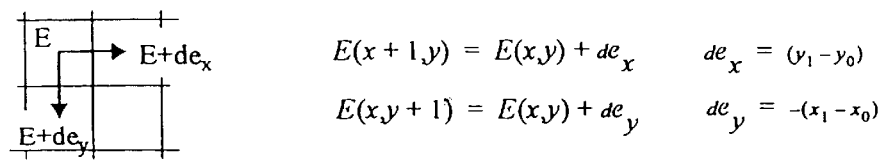
FIG. 25 is an example of the calculation of the edge function.
Figure 26:
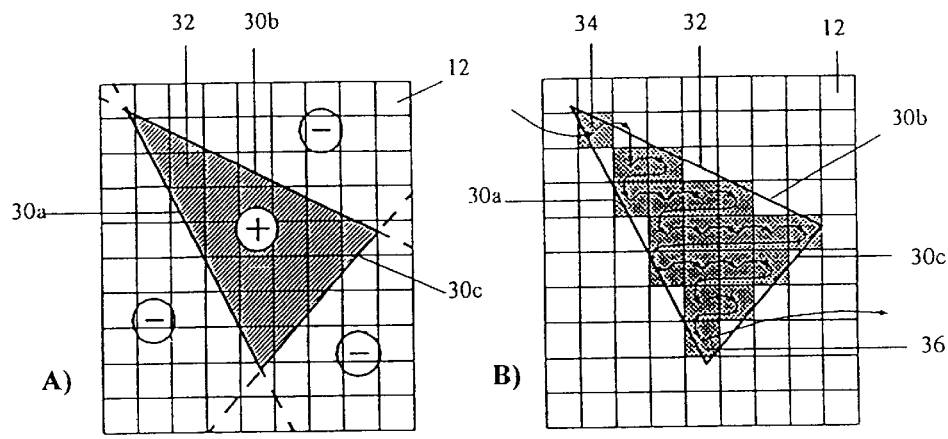
FIG. 26A is an illustration of the signs of the edge function values for a triangle.
FIG. 26B is a potential traversing algorithm for the triangle of FIG. 26A.

The above-described steps are further illustrated in FIG. 15, where a section of graphic primitive 120 is illustrated with its edges 170a (leading edge), 170b and 170c. The respective scanning directions in the x and y directions are illustrated at the top left of FIG. 15.

As can be seen, a first and a second addition must be effected, starting from the leading pixel 172a, for the determination as to whether a leading edge has been exceeded, so as to get to pixel 172b in the adjacent cluster, and in this case, it is sufficient to verify only this pixel 172b with a view to exceeding the edge.

For checking whether a subsequent cluster has exceeded a non-leading edge, pixels 174b and 174c in the nearest column of the subsequent cluster are determined starting from the leading pixel 174a. It is sufficient to check only these two pixels with regard to exceeding the non-leading edges.

The advantage of this approach is that not all pixels of a cluster must be checked.

FIG. 16 shows a table in which the determination of the exceeding of an edge is illustrated by means of the individual parameters which have been described above and which are used by the interpolator.

In addition to determining whether an edge of the graphic primitive has been exceeded in scanning a scan line, it is also required to indicate to the scan converter in which manner it must move through the graphic primitive. A movement determination logic circuit is provided for this, which determines the direction of movement for the edge interpolators on the basis of the above-described determination of the exceeding of an edge. A table is shown in FIG. 17 which contains Boolean expressions which contain a direction of movement for the edge interpolators, which are derived starting from the positive edge sensor values shown in the table in FIG. 16, and whereby the correct movement for this state is defined.

The value "ef" shown in the table in FIG. 17 denotes an edge flag which indicates whether a valid edge return position for the next scan line has already been found in the current scan line. The "sf" strip flag indicates whether a valid strip entry position for the next strip has been found in the current strip.

Based on the selected movements and on the status of the edge and strip flags, the interpolator registers and flags are updated, as is shown in the table in FIG. 18. If none of the conditions shown in FIG. 18 is met, the respective register is not updated.

In addition to the edge function interpolators, all other interpolators for other parameters that may change across the polygon, e.g. texture co-ordinates or Gouraud colors, have to be updated. Even though these interpolators may be directly controlled by the movement variables, the edge flag and the strip flag, a very compact encoding for this information is proposed instead which provides the entire required content for parameter interpolation. This code is referred to as interpolator or scan command. These scan commands are shown in the table in FIG. 19.

As has already been explained above, visibility tests must be carried out for the individual pixels being scanned, so as to determine whether or not these pixels are associated with the scanned graphic primitive. The entire set of edge parameters is interpolated only for one pixel within a cluster. However, with regard to determining the visibility of the individual pixels (vis), it is required to resort to the edge parameters for all pixels. In order to achieve this, the edge parameters for those pixels which have not been interpolated are obtained from the interpolated parameter sets by a corresponding addition of the interpolation deltas, as is shown in FIG. 20A. The spacing between a pixel within a cluster and the leading pixel is referred to as row offset (rofs; $0 \leq \text{rofs} < \text{clx}$) in the y direction, and as column offset (cofs; $0 \leq \text{cofs} < \text{cly}$) in the x direction. For clarifying this notation, the corresponding offset for different clusters and different scanning directions is schematically illustrated in FIG. 20B.

Since only the sign of the edge function for the non-leading pixels must be calculated, the increase in the required gates is limited in a hardware realization for the visibility determination of several pixels.

As has been explained in the above description, the present invention relates to a method for carrying out parallel pixel scan conversions in a hardware pipeline, and provides a favorable and multi-purpose implementation of a scan conversion for parallel image-rendering. A flexible system architecture with a scalability at different levels is supported, and an image-rendering engine may carry out parallel image rendering with regard to any number of pixels with several image-rendering pipelines. Several image-rendering pipelines within a system may carry out the task of image-rendering in an interleaved manner. The footprint of the pixels, which can be rendered in parallel in an engine cycle, may include any number of rows and columns. In addition, the problem of degraded memory bandwidth utilization with decreasing triangle sizes is solved, since an optimized scanning sequence for memories organized on a block-by-block basis is proposed.

Thus, a plurality of pixels may be processed on one chip per system clock cycle in accordance with the present invention and, in addition, several chips may divide rasterization of a graphics element, e.g. a triangle, up between them. Thus, the present invention provides several levels for parallel image rasterization, standard DRAM technology (e.g., synchronous DRAMs) being advantageously used for frame buffer storage. Through the present invention, the problems of decreasing memory utilization and of the low texture-cache match rate, which normally accompany parallel image rasterization, are solved.

What is claimed is:

1. Method for rasterizing a graphic primitive in a graphics system for generating pixel data for the graphic primitive, the graphic primitive having pixels associated therewith, starting from graphic primitive description data, the graphics system having a memory divided into a plurality of blocks, each of which is associated with a predetermined one of a plurality of areas on a display screen, the method comprising the following steps:

associating each block of the plurality of blocks with a distinct and specific memory page in the memory;

scanning the pixels, associated with the graphic primitive, in a first block into which the graphic primitive extends;

while scanning the first block, determining whether the graphic primitive extends into a second block adjacent to the first block, and if this is the case, determining an entry point in the second block determining a starting position for scanning the pixels associated with the graphic primitive in the second block;

after all the pixels associated with the graphic primitive have been scanned in the first block, moving to the determined entry point in the second block and scanning the pixels which are associated with the graphic primitive in the second block;

repeating the pixel scanning step in succeeding blocks until all pixels, associated with the graphic primitive have been scanned in each of the plurality of blocks into which the graphic primitive extends;

and outputting the pixel data.

2. Method as claimed in claim 1, wherein the step of scanning includes the step of scanning the first block in which a starting position for the graphic primitive is arranged.

3. Method as claimed in claim 1, wherein the plurality of blocks are combined to form strips, each strip containing blocks, respectively, which are arranged, in a direction perpendicular to a scanning direction, adjacently to each other, the step of scanning initially comprising the scanning of the pixels, which are associated with the graphic primitive, for blocks of a first strip, and, subsequently, scanning the pixels in blocks of further strips.

4. Method as claimed in claim 1, wherein the pixels associated with the graphic primitive are scanned along a scan line, the number of pixels in the scan line not exceeding the width of a memory block, wherein, after scanning all of the pixels associated with the graphic primitive in the scan line, the pixels associated with the graphic primitive are scanned in the next scan line.

5. Method as claimed in claim 4, further comprising the following steps:

determining whether a first pixel, which is arranged in the scan line, adjacently to the pixel being scanned, is associated with the graphic primitive;

determining whether a second pixel, which is arranged in the next scan line adjacent to the pixel being scanned, is associated with the graphic primitive; and if neither the first pixel nor the second pixel is associated with the graphic primitive, scanning a further pixel associated with the graphic primitive and arranged adjacently to the first pixel and adjacently to the second pixel.

6. Method for rasterizing a graphic primitive having pixels associated therewith in a graphics system for generating pixel data for the graphic primitive, starting from graphic primitive description data, the graphics system having a memory divided into a plurality of blocks each of which is associated with a predetermined one of a plurality of areas on a display screen, and the graphics system including a plurality of graphics processing pipelines, the method comprising the following steps:

associating each block of the plurality of blocks with a distinct and specific memory page in the memory;

simultaneously scanning a plurality of adjacent pixels in a first block into which the graphic primitive extends, the adjacent pixels forming a cluster, at least one of the plurality of adjacent pixels being associated with the graphic primitive, the number of the pixels simultaneously scanned depending on the number of graphics processing pipelines in the graphics system;

while scanning the first block, determining whether the graphic primitive extends into a second block adjacent to the first block, and if this is the case, determining an entry point in the second block determining a starting position for the pixels associated with the graphic primitive in the second block;

after all the pixels associated with the graphic primitive have been scanned in the first block, moving to the determined entry point in the second block and scanning the pixels which are associated with the graphic primitive in the second block;

repeating the pixel scanning step until all of the pixels associated with the graphic primitive have been scanned in each of the plurality of blocks into which the graphic primitive extends; and outputting the pixel data.

7. Method as claimed in claim 6, wherein a cluster includes n adjacent pixels in the scanning direction, and m adjacent pixels in a direction perpendicular to the scanning direction, n and m being greater than or equal to one, the number of the graphics processing pipelines being determined by the product of n and m.

8. Method as claimed in claim 6, wherein all pixels of a cluster are arranged in a memory word which is stored in a memory of the graphics system.

9. Method as claimed in claim 6, wherein the graphics system includes a plurality of graphics processing engines, each of which comprises a plurality of graphics processing pipelines, the method further comprising the following steps:

simultaneously scanning a plurality of adjacent clusters, the number of the clusters scanned simultaneously depending on the number of the graphics processing engines in the graphics system; and repeating the cluster scanning step until all of the pixels associated with the graphic primitive have been scanned.

10. Method as claimed in claim 6, further comprising the following steps:

determining whether a first cluster, which is arranged in the scanning direction adjacently to the adjacent cluster, contains pixels which are associated with the graphic primitive;

determining whether a second cluster, which is arranged in a direction perpendicular to the scanning direction adjacently to the scanned cluster, contains pixels which are associated with the graphic primitive; and if neither the first cluster nor the second cluster contains any pixels which are associated with the graphic primitive, scanning a further cluster adjacent to the first cluster and adjacent to the second cluster.

11. Method as claimed in claim 6, further comprising the following steps:

for each pixel in a cluster, determining whether the respective pixel is associated with the graphic primitive;

generating a visibility signal for each pixel, the visibility signal having a first value if the pixel is associated with the graphic primitive, and having a second value if the pixel is not associated with the graphic primitive; and outputting the visibility signal for each pixel.

12. Method as claimed in claim 6, further comprising the step of receiving the graphic primitive description data, the graphic primitive description data including the following information:

co-ordinates for a starting point of the graphic primitive;

values for a linear edge function for the starting point;

incremental values for the edges of the graphic primitive for pixel-by-pixel scanning in a predetermined scanning direction; and indications of the rows and columns, starting from the starting point in the scanning direction, across which the graphic primitive extends.

13. Method as claimed in claim 6, further comprising the step of receiving graphics system information including the following information:

system interleave factors in x and y directions;

interleave offsets in the system;

dimension of a cluster; and the memory strip width in pixels.

14. Method as claimed in claim 6, further comprising the following steps prior to scanning:

determining an initial position within a cluster, starting from the starting position, the initial position being specified by the co-ordinates of the pixel in the cluster which is closest to the scanning direction; and for each of the graphics processing engines, determining the first cluster, in the scanning direction, which is associated with the respective graphics processing engine.

15. Method as claimed in claim 6, wherein the step of scanning includes incrementally calculating the linear edge function for the graphic primitive in accordance with the following steps:

determining whether an adjacent cluster has exceeded an edge of the graphic primitive, in accordance with the following steps:

determining whether that pixel of the adjacent cluster which is nearest in the y direction and that pixel of the adjacent cluster which is most remote in the x direction has exceeded a leading edge of the graphic primitive; and determining whether that pixel of the adjacent cluster which is nearest in the x direction has exceeded a non-leading edge of the graphic primitive; and determining the pixel for which the next increment of the linear edge function is to be calculated.

* * * * *